Patented Jan. 1, 1952

2,581,186

UNITED STATES PATENT OFFICE 2,581,186

PAPER HAVING IMPROVED PRINTING CHARACTERISTICS

Barrett K. Green, Dayton, Ohio, assignor to The National Cash Register Company, Dayton, Ohio, a corporation of Maryland No Drawing. Application November 18, 1948, Serial No. 60,840

2 Claims. (Cl. 117—152)

This invention relates to paper having improved printing characteristics, and particularly pertains to improvements in the resistance to ink bleed brought about by the use of zeolite material in a coating or as a filling.

Resistance to ink bleed, which is the spreading of ink beyond the areas of the printing or writing impression, has been controlled heretofore by the use of filler or coating material of fine particle size, the particles forming an absorbent and surface-adsorbent structure which tends to hold the fluid portion of the ink from spreading. The best and most commonly known and used material for this purpose, up to the present time, has been kaolin which is composed of scale-like particles which afford adsorption areas on their broad outer surfaces.

This invention provides paper, which is coated or filled with particles the major portion of which are zeolite material, either natural or synthetic, said zeolite particles having natural channels running interiorly thereof, a portion of which are large enough to permit the entry of molecules of oil or other printing fluid. The channels form a skeletal network in each particle which greatly increases the available adsorptive surface, per unit volume of material.

As compared to adsorbent materials now used for paper filling and coating, which have only surface adsorption, zeolite materials have much greater adsorptive capacity because of the internal channels and, therefore, much less need be used to obtain standard ink bleed characteristic.

It is the principal object of this invention to provide printing paper having thereon, or therein, particles of zeolite material with internal channels which act as adsorbers of the fluids of ink.

Another object of the invention is to provide printing paper wherein the zeolite material is incorporated in the paper stock while the paper is being made.

Another object of the invention is to provide printing paper wherein the zeolite material is applied to the printing surface of paper by means of a binder material.

With these and incidental objects in view, the invention includes certain novel features, the essential elements of which are set forth in appended claims and a preferred embodiment of which is hereinafter described.

Zeolite materials, which exist naturally, are aluminum silicates having base exchange cations of sodium or calcium which may be replaced by other metallic ions such as nickel, copper, iron, zinc, mercury, barium, lead, cadmium, or potassium. Four principal types of zeolite particle structures or frameworks are recognized at the present time, as represented by the following minerals:

Analcite $[(AlSi_2)O_6]^{-1}Na^{+1}.H_2O$
Chabazite $[(Al_2Si_4)O_{12}]^{-2}Ca^{+2}, Na_2^{+1}.6H_2O$
Natrolite $[(Al_2Si_2)O_{10}]^{-2}Na^{+1}.2H_2O$
Heulandite $[(Al_2Si_7)O_{18}]^{-2}Ca^{+2}.6H_2O$ Sodalite, helvite and noselite are other examples of well known zeolite minerals. Zeolite materials made artificially and having the typical channeled internal structure are included as of the class of substances useful for the purposes of this invention.

All of these zeolite structures are available in or can be ground to particle form of the order of 10 microns which is suitable for filling or coating paper.

Inasmuch as the filling of paper requires the use of paper making machinery, the preferred form of the invention pertains to the use of the zeolite material as an ingredient of a paper coating, comprising the zeolite particles and a binder or adhesive. Inasmuch as the improved printing characteristics contributed by the zeolite material is concerned with its adsorptive power alone, a mixture of zeolite particles of the various member mineral of the class may be used.

The novel printing paper has been successfully made by cooking 20%, by weight, of paper coating starch in water at 200° Fahrenheit for 15 minutes, cooling it to room temperature, separately dispersing 1 part, by weight, of zeolite material in 3 parts, by weight, of water, and mixing four parts, by weight, of the zeolite dispersion with one part, by weight, of the starch solution and applying the resultant mixture to paper and drying it in any convenient manner, the application being made so as to leave a coating, when dried, of about .0005 of an inch in thickness. The thickness, however, may be varied, as desired.

Another coating containing particles of zeolite material may be made as follows: A starch solution, as previously described is made. Next, 1 part of casein, by weight, is dispersed in two parts, by weight, of cold water and allowed to swell for one-half hour, after which seven more parts, by weight, of cold water and $\frac{1}{10}$ part, by weight, of ammonium hydroxide of 25° Baumé are added. This casein dispersion is heated on a water bath at 165° Fahrenheit for 15 minutes and then allowed to cool. A selected latex, either natural or artificial, of 45% solids content, is prepared. Zeolite particles are dispersed in water as before described except the water should contain 0.2 per cent, by weight, of sodium pyrophosphate. To 10 parts, by weight, of the dispersion of zeolite material, eliminating the weight of the water, is added 3.5 parts, by weight, of the starch solution, 1.6 parts, by weight, of the latex, and 1 part, by weight, of the casein solution. The coating should then be applied to paper so as to leave a dried coating approximately .0005 of an inch in thickness.

In making filled paper, the selected zeolite material in the desired amounts is simply added and dispersed in the paper stock before it is run on to the paper making machine.

While the forms of the invention herein described are admirably adapted to fulfill the objects primarily stated, it is understood that it is not intended to confine the invention to forms herein disclosed, for it is susceptible of embodiment in various forms all coming within the scope of the claims which follow.

What is claimed is:

1. Paper filled with solid particles the major portion of which are zeolite material having internal adsorbent surfaces.

2. Paper having a surface coating containing solid particles the major portion of which are zeolite particles having internal adsorbent surfaces.

3. The paper of claim 1 wherein the particles are of the order of 10 microns in greatest dimension, as an average.

4. The paper of claim 2 wherein the particles are of the order of 10 microns in greatest dimension, as an average.

5. The paper of claim 1 in which the particles are selected from the group of minerals consisting of analcite, chabazite, natrolite, heulandite, sodalite, helvite, and noselite and mixtures thereof.

6. The paper of claim 2 in which the particles are selected from the group of minerals consisting of analcite, chabazite, natrolite, heulandite, sodalite, helvite and noselite and mixtures thereof.

7. The paper of claim 2 in which the particles are held on the surface by a binder.

8. Printing paper including as ink bleed resistant material solid particles the major portion of which are zeolite material.

BARRETT K. GREEN.

REFERENCES CITED

The following references are of record in the file of this patent:

UNITED STATES PATENTS

| Number | Name | Date |
|---|---|---|
| 2,287,161 | Ball | June 23, 1942 |
| 2,307,239 | Rowland | Jan. 5, 1943 |
| 2,371,266 | Schur | Mar. 13, 1945 |